US009903392B2

(12) United States Patent
Cho et al.

(10) Patent No.: US 9,903,392 B2
(45) Date of Patent: Feb. 27, 2018

(54) APPARATUS FOR CONTROLLING HYDRAULIC PUMP FOR CONSTRUCTION MACHINE

(71) Applicant: Doosan Infracore Co., Ltd., Incheon (KR)

(72) Inventors: Young Sik Cho, Gyeonggi-do (KR); Woo Yong Jung, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 233 days.

(21) Appl. No.: 14/778,759

(22) PCT Filed: Mar. 3, 2014

(86) PCT No.: PCT/KR2014/001715
§ 371 (c)(1),
(2) Date: Sep. 21, 2015

(87) PCT Pub. No.: WO2014/148748
PCT Pub. Date: Sep. 25, 2014

(65) Prior Publication Data

US 2016/0047398 A1 Feb. 18, 2016

(30) Foreign Application Priority Data

Mar. 21, 2013 (KR) ........................ 10-2013-0030363

(51) Int. Cl.
*F16D 31/02* (2006.01)
*F15B 11/028* (2006.01)
(Continued)

(52) U.S. Cl.
CPC .......... *F15B 11/028* (2013.01); *E02F 9/2235* (2013.01); *E02F 9/2292* (2013.01);
(Continued)

(58) Field of Classification Search
CPC ...... F15B 11/17; F04B 49/002; F04B 49/065; F04B 49/08
See application file for complete search history.

(56) References Cited

U.S. PATENT DOCUMENTS 6,183,210 B1 * 2/2001 Nakamura ............ F04B 49/002 60/431
6,823,672 B2 * 11/2004 Nakamura .............. F15B 11/17 60/449
(Continued)

FOREIGN PATENT DOCUMENTS

CN 1692227 A 11/2005
CO 101542131 A 9/2009
(Continued)

OTHER PUBLICATIONS

International Search Report with English Translation from the Korean Intellectual Property Office dated Jun. 3, 2014 for corresponding International Application No. PCT/KR2014/001715 filed Mar. 3, 2014, 5 pages.
(Continued)

*Primary Examiner* — Michael Leslie
(74) *Attorney, Agent, or Firm* — John D. Veldhuis-Kroeze; Westman, Champlin & Koehler, P.A.

(57) ABSTRACT

The present disclosure relates to an apparatus for controlling a hydraulic pump for a construction machine. The apparatus for controlling the hydraulic pump for the construction machine according to the present disclosure includes: a hydraulic pump control device configured to generate first and second pump commands for controlling first and second hydraulic pumps so that the first and second hydraulic pumps generate pump torque corresponding to a request value; and a torque controller configured to generate first and second corrected pump commands, which are the corrected first and second pump commands, by a torque incli-
(Continued)

nation map generated by reflecting a dynamic characteristic of an engine, and to provide the first and second corrected pump commands to the first and second hydraulic pumps.

4 Claims, 6 Drawing Sheets

(51) Int. Cl.

| | |
|---|---|
| ***F04B 49/06*** | (2006.01) |
| ***F02D 29/04*** | (2006.01) |
| ***E02F 9/22*** | (2006.01) |
| ***F15B 11/17*** | (2006.01) |
| ***F15B 11/08*** | (2006.01) |
| ***F15B 13/16*** | (2006.01) |

(52) U.S. Cl.

CPC ............ *E02F 9/2296* (2013.01); *F02D 29/04* (2013.01); *F04B 49/065* (2013.01); *F15B 11/08* (2013.01); *F15B 11/17* (2013.01); *F15B 13/16* (2013.01); *F15B 2211/205* (2013.01); *F15B 2211/20523* (2013.01); *F15B 2211/20553* (2013.01); *F15B 2211/20576* (2013.01); *F15B 2211/2656* (2013.01); *F15B 2211/605* (2013.01); *F15B 2211/633* (2013.01); *F15B 2211/6346* (2013.01); *F15B 2211/6651* (2013.01); *F15B 2211/6652* (2013.01); *F15B 2211/6654* (2013.01); *F15B 2211/6655* (2013.01); *F15B 2211/6658* (2013.01); *F15B 2211/75* (2013.01)

(56) References Cited

U.S. PATENT DOCUMENTS

| | | | | |
|---|---|---|---|---|
| 8,162,618 B2 * | 4/2012 | Nakamura | .............. | F04B 49/08<br>60/452 |
| 9,206,798 B2 * | 12/2015 | Jung | ..................... | F04B 49/065 |

FOREIGN PATENT DOCUMENTS

| | | |
|---|---|---|
| JP | H06-081772 A | 3/1994 |
| JP | H07-190009 A | 7/1995 |
| KR | 10-2005-0004221 A | 1/2005 |
| KR | 10-2011-0001497 A | 1/2011 |
| KR | 10-2011-0073082 A | 6/2011 |

OTHER PUBLICATIONS

Chinese Office Action dated Aug. 1, 2016 for Chinese Application No. 201480017037.3, 1 page.

Chinese Office Action with English Translation dated Apr. 27, 2017 for Chinese Application No. 201480017037.3, 8 pages.

* cited by examiner

APPARATUS FOR CONTROLLING HYDRAULIC PUMP FOR CONSTRUCTION MACHINE

CROSS REFERENCE TO RELATED APPLICATION

This Application is a Section 371 National Stage Application of International Application No. PCT/KR2014/001715 filed Mar. 3, 2014 and published, not in English, as WO 2014/148748 A1 on Sep. 25, 2014.

FIELD OF THE DISCLOSURE

The present disclosure relates to an apparatus for controlling a hydraulic pump for a construction machine, and more particularly, to an apparatus for controlling a hydraulic pump for a construction machine, which reflects a dynamic characteristic of an engine to control a hydraulic pump.

BACKGROUND OF THE DISCLOSURE

In general, a hydraulic system is mounted in a construction machine to operate various operating devices. The hydraulic system receives power from an engine and operates a hydraulic pump, and operates various operating devices by working oil discharged from the hydraulic pump.

An electronically controllable electronic hydraulic pump is known as the hydraulic pump. Further, the hydraulic pump may be divided into a pressure control type.

The pressure control type electronic hydraulic pump may electronically control an angle of a swash plate to control a size of finally output pump torque. Further, the pressure control type electronic hydraulic pump is a type of controlling pressure of the pump in proportion to a detected pressure value of working oil.

As the related art, Patent Literature 1 "Apparatus and Method of Controlling Hydraulic Pump for Construction Machine" filed by the applicant of the present disclosure and published is known.

Patent Literature 1 relates to a method of controlling output torque of a hydraulic pump, and is a technology of mapping torque response performance of an engine to a time constant corresponding to a pump torque control means based on engine speed.

In order to find a time constant used for control in Patent Literature 1, it is very important to recognize a dynamic characteristic according to an engine speed, and the hydraulic system in the related art sets a time constant based on a reach of a load pattern from a standby load (zero or a predetermined level) to a full load to perform a control.

In the time constant control method, when a load is not the largest load, an inclination of output torque of a hydraulic pump is decreased, so that an engine speed is not decreased, but an operation speed is unintentionally decreased, thereby degrading workability.

Literature of related art: Korean Patent Application Laid-Open No. 10-2011-0073082 (Jun. 29, 2011)

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

Accordingly, a technical problem to be solved by some embodiments of the present disclosure is to provide an apparatus for controlling a hydraulic pump for a construction machine, which recognizes a dynamic characteristic of an engine and provides a torque inclination map for each load range so that the dynamic characteristic of the engine is reflected to control output torque of a hydraulic pump.

In order to solve the technical problems of the present disclosure, an exemplary embodiment of the present disclosure provides an apparatus for controlling a hydraulic pump for a construction machine, including: a hydraulic pump control device 100 configured to generate first and second pump commands Pcmd1 and Pcmd2 for controlling first and second hydraulic pumps P1 and P2 so that the first and second hydraulic pumps P1 and P2 generate pump torque corresponding to a request value; and a torque controller 200 configured to generate first and second corrected pump commands Pcmd11 and Pcmd22, which are the corrected first and second pump commands Pcmd1 and Pcmd2, by a torque inclination map 220 generated by reflecting a dynamic characteristic of an engine by the hydraulic pump control device 100, and provide the first and second corrected pump commands Pcmd11 and Pcmd22 to the first and second hydraulic pumps P1 and P2.

The torque inclination map 220 may be generated by setting a section of a hydraulic load into three to five sections within a range from a minimum hydraulic load to a maximum hydraulic load, and calculating a torque inclination of each time point, at which a phenomenon of dropping an engine speed is stable when a hydraulic load is generated, for each section.

A range of each section for each hydraulic load may be differently set.

A range of each section for each hydraulic load may be set to be relatively narrow in a large load section compared to a small load section.

In the apparatus for controlling the hydraulic pump for the construction machine according to the present disclosure configured as described above, when a normal output is not made due to deterioration or a change of an engine in a hydraulic system, in which a pressure control type electronic hydraulic pump is mounted, a hydraulic pump is controlled by a torque inclination map for each load range reflecting a dynamic characteristic of the engine, so that it is possible to improve the amount of decrease of an engine speed according to a change in a pump load.

Further, the apparatus for controlling the hydraulic pump for the construction machine according to the present disclosure may improve a degree of variation of a pump load and further improve performance of controlling an operating device.

DESCRIPTION OF MAIN REFERENCE NUMERALS OF THE DRAWINGS

Figure 1:
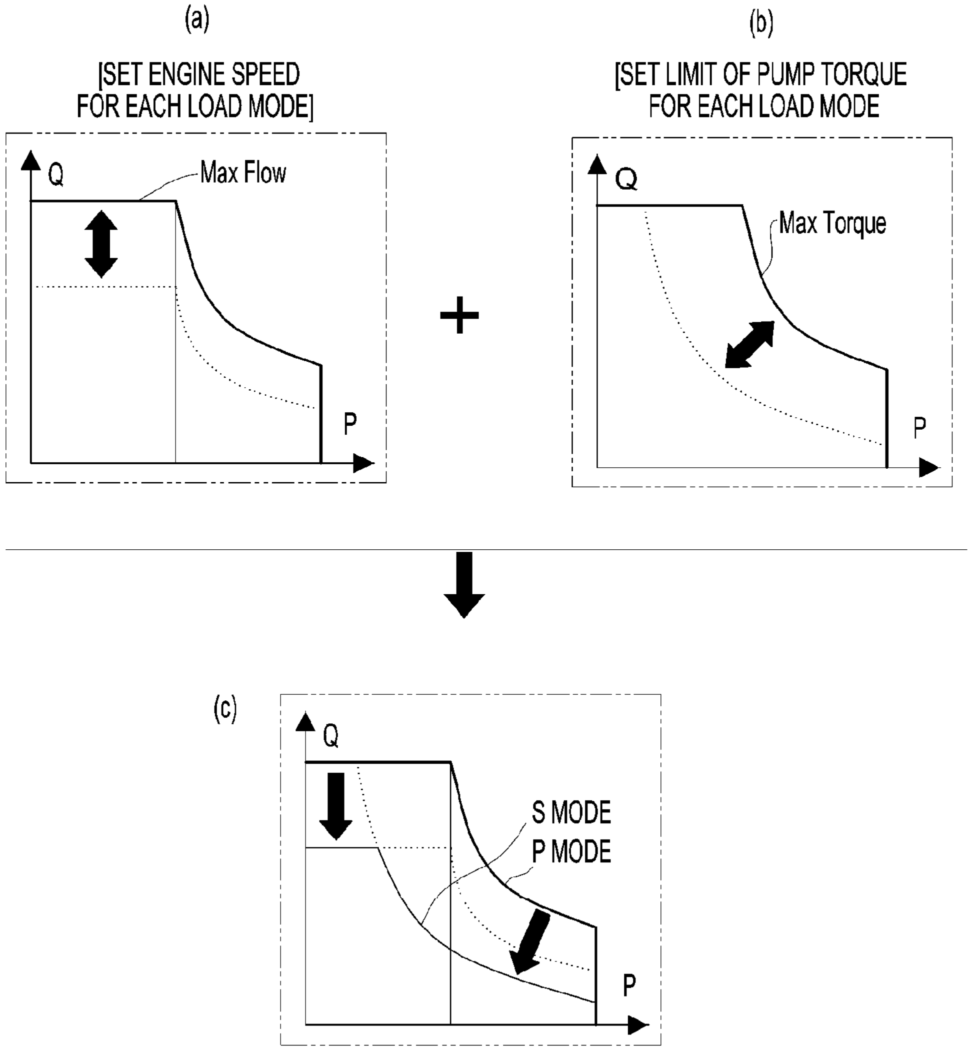
FIG. 1 is a diagram for describing an apparatus and a method of controlling an apparatus for controlling a hydraulic pump according to a comparative example.

| | |
|---|---|
| 10: Request unit | 20: Load mode selecting unit |
| 30: Engine speed setting unit | 40: Engine Control Unit (ECU) |
| 100: Hydraulic pump control unit | |
| 110: Horsepower controller | 120: Flow rate controller |
| 130: Torque distribution controller | 140: Pump controller |
| 200: Torque controller | 210: Torque calculating unit |
| 220: Torque inclination map | |
| P1, P2: First and second hydraulic pumps | |

DETAILED DESCRIPTION

Advantages and characteristics of the present disclosure, and a method of achieving the advantages and characteristics will be clear referring to an exemplary embodiment to be described in detail together with the accompanying drawings.

Hereinafter, an exemplary embodiment of the present disclosure will be described in detail with reference to the accompanying drawings. It should be appreciated that the exemplary embodiment, which will be described below, is illustratively described for helping the understanding of the present disclosure, and the present disclosure may be variously modified to be carried out differently from the exemplary embodiment described herein. In the following description of the present disclosure, a detailed description and a detailed illustration of publicly known functions or constituent elements incorporated herein will be omitted when it is determined that the detailed description may unnecessarily make the subject matter of the present disclosure unclear. Further, the accompanying drawings are not illustrated according to an actual scale, but sizes of some constituent elements may be exaggerated to help understand the present disclosure.

Further, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

First, a control of a hydraulic pump will be described with reference to FIG. 1.

FIG. 1A is a diagram for describing a flow rate control. The flow rate may be controlled according to a line diagram P-Q. That is, maximum torque output by an engine is determined, so that a hydraulic pump is operated within a stable range, in which an engine is not stopped. For example, when a high pressure is required, a flow rate is decreased, and when pressure is low, the hydraulic pump is controlled so that a maximum flow rate is discharged.

FIG. 1B is a diagram for describing a horsepower control. The horsepower control controls the hydraulic pump by previously selecting a load mode. That is, in order to improve operation performance, a higher load mode is selected so that maximum torque is output, and when an operation of a light load is desired to be performed, a lower load mode is selected so that maximum torque is decreased.

The aforementioned load mode may be expressed by a light load mode, a standard load mode, a heavy load mode, and the like. Further, the aforementioned load mode may be expressed by a full power mode, a power mode, a standard mode, an economy mode, an idle mode, and the like. That is, the load mode may be various expressed according to lightness and heaviness of a load or a size of output torque.

FIG. 1C illustrates a control of the hydraulic pump by complexly applying a flow rate control and a horsepower control.

That is, when a type of operation has a heavy load, the operation is performed by selecting a higher power mode (P-mode), and when a type of operation has a light load, the operation is performed by selecting a lower standard mode (S-mode). Accordingly, when a load mode is changed from the power mode to the standard mode, the maximum discharged flow rate is limited to be decreased, so that the hydraulic pump is controlled.

As illustrated in FIG. 1C, a correlation between pump torque and an engine speed when the hydraulic pump is controlled by combining the flow rate control and the horsepower control in the comparative example will be described with reference to FIGS. 2 and 3.

Figure 2:
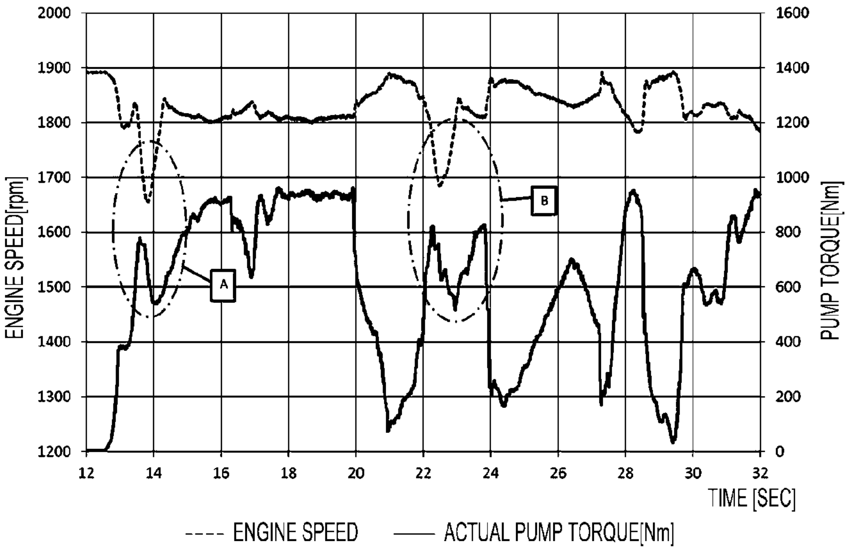
FIG. 2 is a time progression graph for an engine speed and pump torque generated by the apparatus for controlling the apparatus for controlling the hydraulic pump according to the comparative example.

FIG. 2 is a time progression graph for an engine speed and pump torque generated by the apparatus for controlling the apparatus for controlling the hydraulic pump according to the comparative example. FIG. 3 is a pump torque graph for an engine speed generated by a control of the apparatus for controlling the hydraulic pump according to the comparative example.

A and B in FIG. 2 represent cases where a joystick is sharply operated, so that a request value (flow rate/hydraulic pressure) is sharply required. In this case, it is represented a form in that the engine speed is sharply and momentarily decreased, and actual pump torque is unstably decreased.

Figure 3:
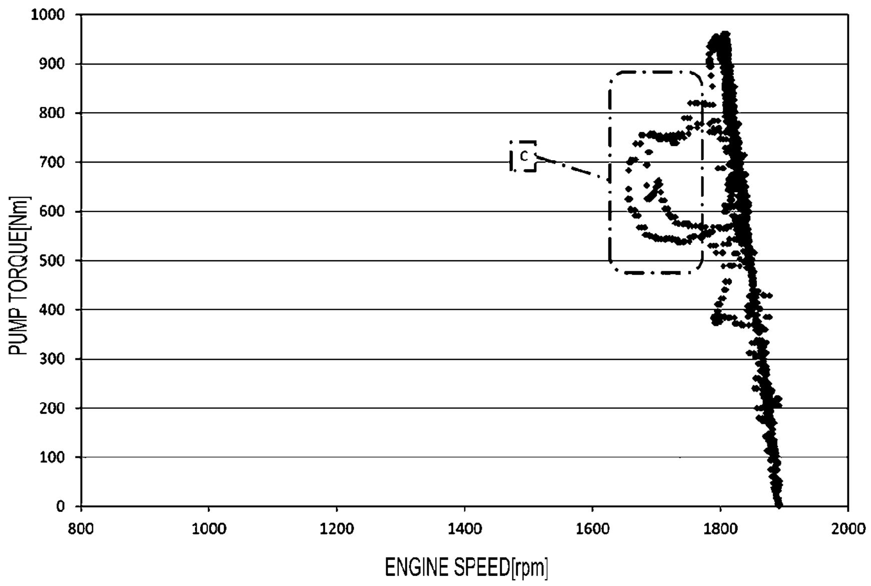
FIG. 3 is a pump torque graph for an engine speed generated by a control by the apparatus for controlling the hydraulic pump according to the comparative example.

Referring to FIG. 3, the engine speed exhibits a linear form before and after a rated rpm of 1,800 rpm to 1,900 rpm, but has an unstably bounded portion as part C. Part C corresponds to parts A and B of FIG. 2. That is, in the comparative example, it can be seen that when the joystick is rapidly operated, finally output pump torque is unstable, and thus there is a problem in that workability of an operating device is decreased.

Part C will be additionally described below.

When the joystick is sharply operated, maximally required torque (max torque) by a joystick lever is increased, and when an engine speed is decreased, output torque T of the hydraulic pump is decreased.

When only the amount of change in maximally required torque (max torque) is controlled, an engine speed is decreased in a part in which the amount of change in actual torque is sharply changed, which may cause performance deterioration that limits usable energy. That is, fuel is injected with the general amount of injection, and when an engine speed is decreased, fuel loss is increased even though the total of energy generable with consumed fuel exists, resulting in deterioration of fuel efficiency.

On the other hand, when a size of torque has a control limit by monitoring an engine speed, a result value is fed back as a subsequent measure, so that it is difficult to react to a sudden change in engine speed. Further, there may be a problem in that finally output final torque of the hydraulic pump is unstable, so that controllability of an operating device deteriorates.

Hereinafter, an apparatus for controlling a hydraulic pump for a construction machinery according to an exemplary embodiment of the present disclosure will be described with reference to FIGS. 4 to 8.

Figure 4:
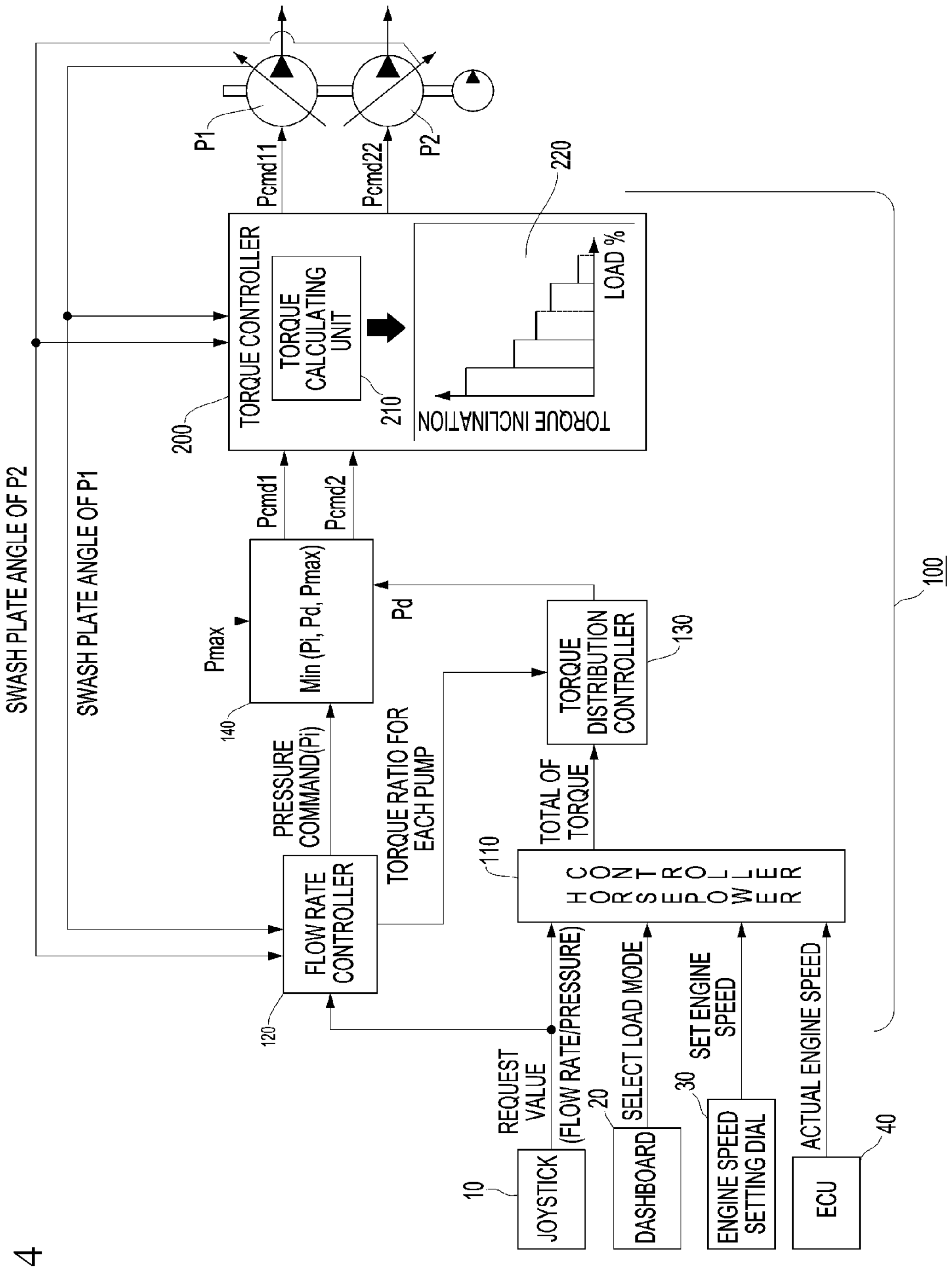
FIG. 4 is a diagram for describing an apparatus for controlling a hydraulic pump for a construction machine according to an exemplary embodiment of the present disclosure.
Figure 5:
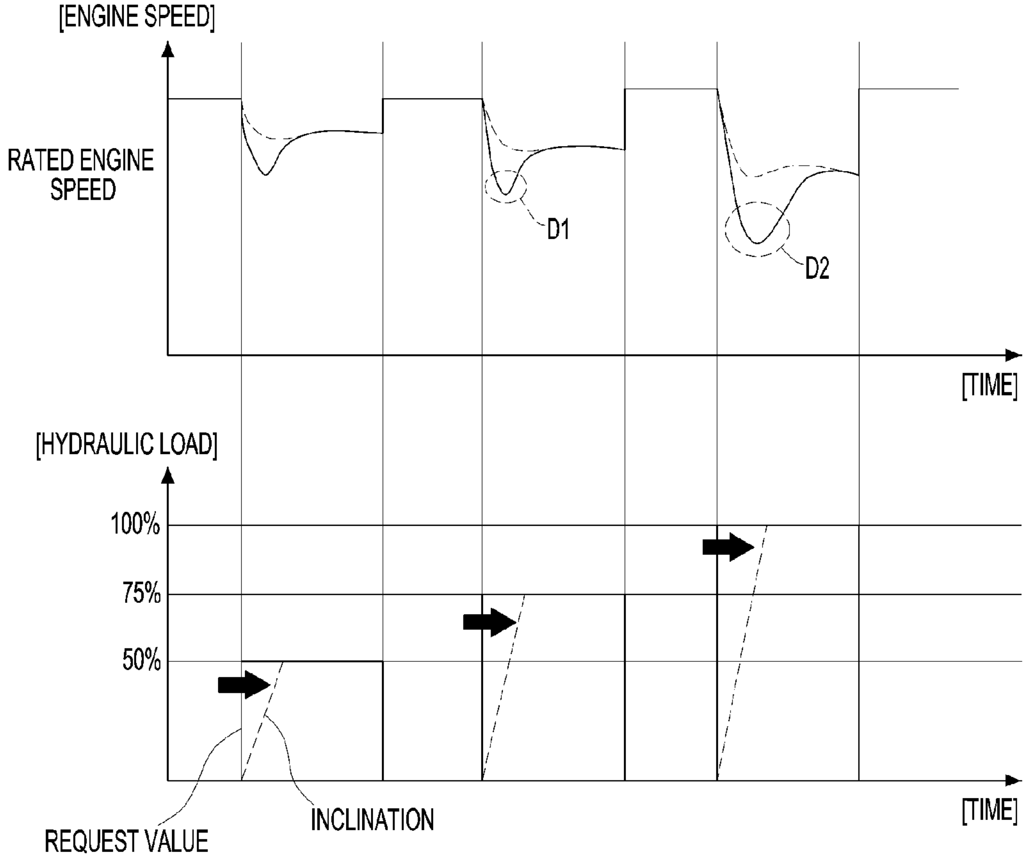
FIG. 5 is a diagram for describing a change in an engine speed when the apparatus for controlling the hydraulic pump for the construction machine according to the exemplary embodiment of the present disclosure increases a load for each step.
Figure 6:
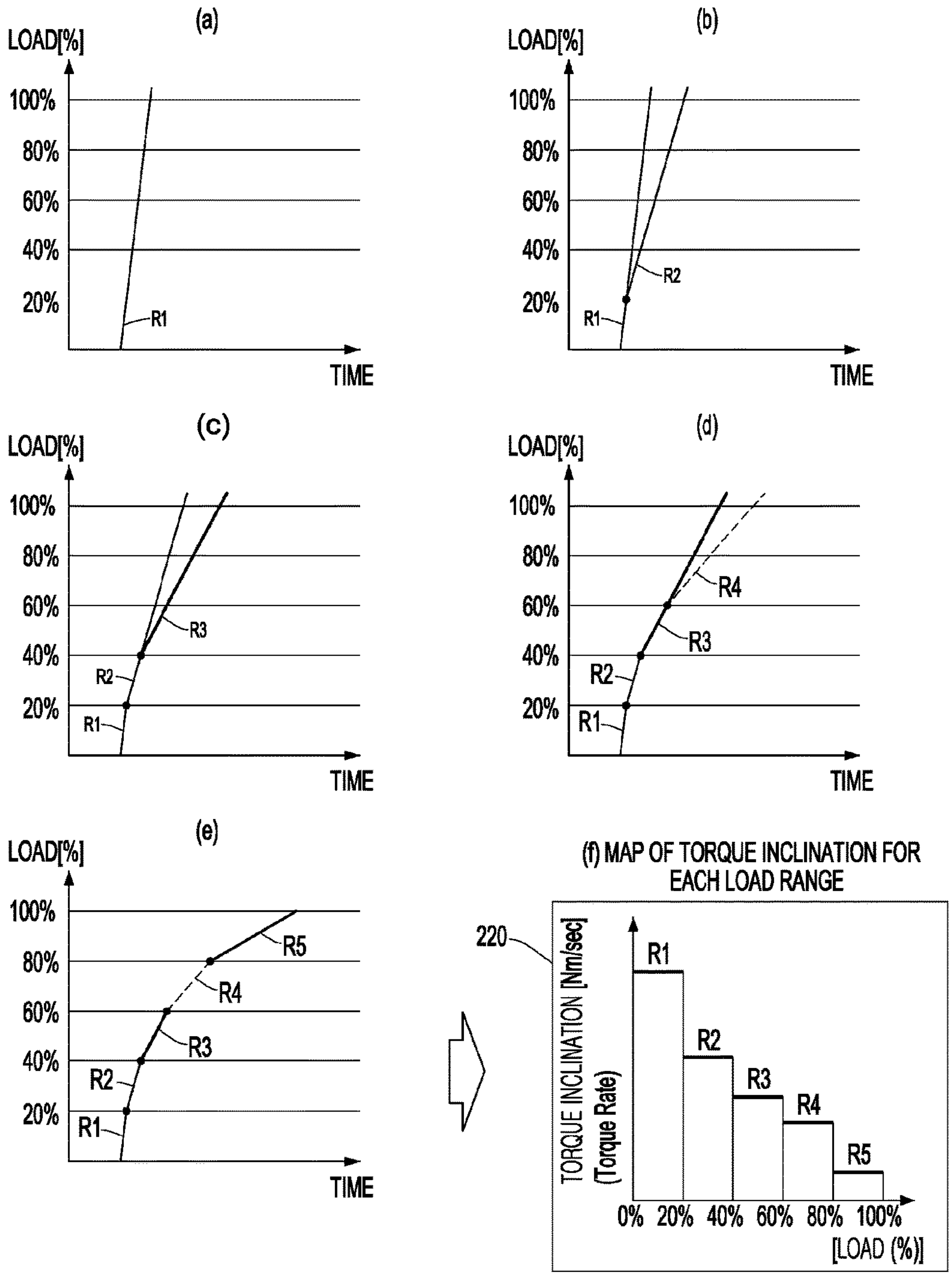
FIG. 6 is a diagram for describing an example, in which a torque inclination is set for each load range by the apparatus for controlling the hydraulic pump for the construction machine according to the exemplary embodiment of the present disclosure.
Figure 7:
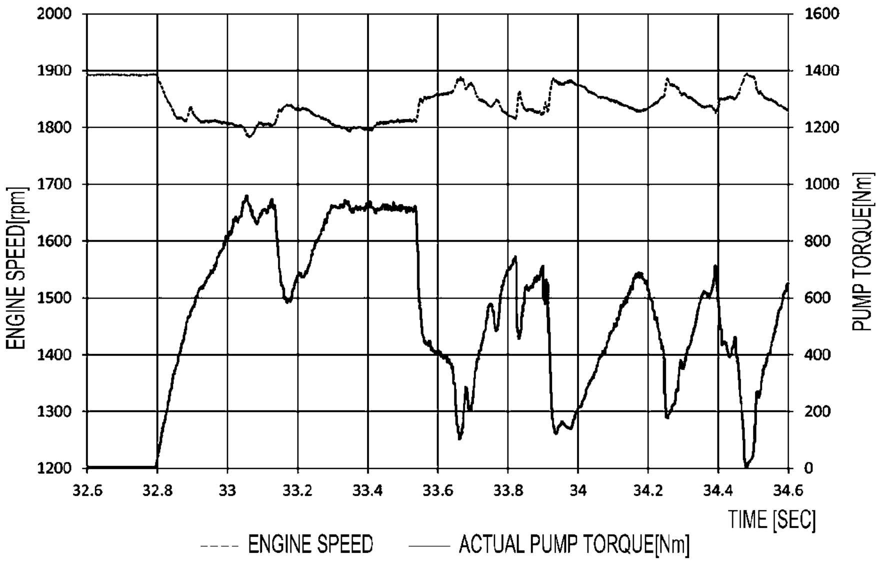
FIG. 7 is a time progression graph for an engine speed and pump torque generated by the apparatus for controlling the hydraulic pump for the construction machine according to the exemplary embodiment of the present disclosure.
Figure 8:
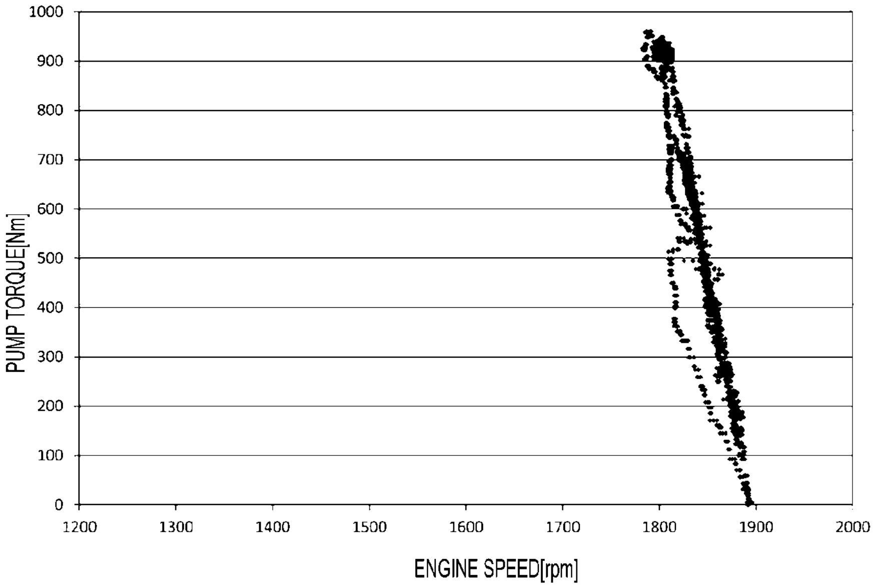
FIG. 8 is a pump torque graph for an engine speed generated by a control by the apparatus for controlling the hydraulic pump for the construction machine according to the exemplary embodiment of the present disclosure.

FIG. 4 is a diagram for describing an apparatus for controlling a hydraulic pump for a construction machine according to an exemplary embodiment of the present disclosure. FIG. 5 is a diagram for describing a change in an engine speed when the apparatus for controlling the hydraulic pump for the construction machine according to the exemplary embodiment of the present disclosure increases a load for each step. FIG. 6 is a diagram for describing an example, in which a torque inclination is set for each load range by the apparatus for controlling the hydraulic pump for the construction machine according to the exemplary embodiment of the present disclosure. FIG. 7 is a time progression graph for an engine speed and pump torque generated by the apparatus for controlling the hydraulic pump for the construction machine according to the exemplary embodiment of the present disclosure. FIG. 8 is a pump torque graph for an engine speed generated by a control by the apparatus for controlling the hydraulic pump for the construction machine according to the exemplary embodiment of the present disclosure.

A hydraulic pump control apparatus 100 generates a flow rate and hydraulic pressures of working oil discharged from a plurality of first and second hydraulic pumps P1 and P2 in response to a required flow rate/hydraulic pressure.

The hydraulic pump control apparatus 100 includes a horsepower controller 110 and a flow rate controller 120 for controlling the hydraulic pump. The horsepower controller 110 receives information from a request unit 10, a load mode selecting unit 20, an engine speed setting unit 30, and an Engine Control Unit (ECU) 40.

The request unit 10 may include a joystick, a pedal, and the like. For example, when a joystick is operated with a maximum displacement, a request signal for a request value (flow rate/hydraulic pressure) is generated, the request signal is provided to the horsepower controller 110 and the flow rate controller 120.

The load mode selecting unit 20 selects a load mode according to lightness and heaviness of an operation desired to be performed by an operator. For example, the load mode selecting unit 20 selects a load mode on a dashboard, and selects any one load mode among an excessively heavy mode, a heavy load mode, a standard load mode, a light load mode, and an idle mode. When a higher load mode is selected, high pressure is formed in working oil discharged from the hydraulic pump, and when a lower load mode is selected, a flow rate of working oil discharged from the hydraulic pump is increased.

The engine speed setting unit 30 enables a manager to arbitrarily select an engine speed. For example, an operator sets a desired engine speed by adjusting an rpm dial. When an engine speed is set to be larger, the engine may provide larger power to the hydraulic pump, but there is a concern in that fuel consumption may relatively increase and durability of the construction machine may deteriorate, so that it is preferable to set an appropriate engine speed. In a case of the standard load mode, an engine speed may be set to, for example, about 1,400 rpm, and may also be set to be larger or smaller according to a tendency of an operator.

The ECU 40 is a device controlling the engine, and provides actual engine speed information to the horsepower controller 110.

The horsepower controller 110 calculates a total of required torque by processing the collected information and the total of torque is provided to the torque distribution controller 130.

In the meantime, the flow rate controller 120 receives information on swash plate angles of the first and second hydraulic pumps P1 and P2 and recognizes a degree of a currently discharged flow rate, adds or subtracts a flow rate required by the request unit 10 to or from the recognized flow rate, and calculates a degree of torque to be required in the future. In the meantime, the hydraulic pump is provided with the first hydraulic pump P1 and the second hydraulic pump P2, so that a torque ratio is determined for each hydraulic pump and the information on the determined torque ratio is provided to the torque distribution controller 130.

Further, the flow rate controller 120 calculates a size of pressure to be required in the future, and provides the required pressure to the pump controller 140 as a pressure command Pi.

The torque distribution controller 130 provides a torque command Pd of a torque size to be taken in charge by each of the first hydraulic pump P1 and the second hydraulic pump P2 according to a torque size ratio received from the flow rate controller 120 in the total of torque received from the horsepower controller 110 to the pump controller 140. The torque command Pd includes a control signal for controlling each of the first and second hydraulic pumps P1 and P2.

The pump controller 140 selects the smallest value among a maximum pump pressure value Pmax, a value of the pressure command Pi, and a value of the distributed torque command Pd and outputs the selected value as a pump command value, and the pump command value is divided and output into a first pump command Pcmd1 controlling the first hydraulic pump P1 and a second pump command Pcmd2 controlling the second hydraulic pump P2.

In a general situation, the aforementioned first and second pump commands Pcmd1 and Pcmd2 are provided to the first and second hydraulic pumps P1 and P2, respectively, and the first and second hydraulic pumps P1 and P2 generate discharged flow rates and discharged pressures of working oil according to the first and second pump commands Pcmd1 and Pcmd2.

However, the dynamic characteristic of the engine may be changed due to deterioration of the engine or an external reason, and in this case, the unstable phenomenon of the engine speed is exhibited as illustrated in part C of FIG. 3 of the comparative example.

In the hydraulic pump control apparatus 100 according to the present disclosure, the first and second hydraulic pumps P1 and P2 are stably controlled by adding the first and second pump commands Pcmd1 and Pcmd2 to the torque controller 200.

The torque controller 200 includes a torque calculating unit 210 and a torque inclination map 220.

The torque calculating unit 210 is calculated by Equation 1 below.

$$T=P\times Q\times A \quad \text{[Equation 1]}$$

T: Size of a pump torque generated by the hydraulic pump

P: Pressure of working oil discharged from the hydraulic pump

Q: Flow rate of working oil discharged from the hydraulic pump per unit rotation A: Constant for converting a unit of power into a horsepower unit The torque inclination map 220 is a map of a torque inclination generated by confirming a dynamic characteristic of the engine according to a hydraulic load. The generation of the torque inclination map will be described with reference to FIGS. 5 and 6.

As represented in FIG. 5, when it is assumed that a maximum generable hydraulic load is 100%, a range of a hydraulic load is set in stages, and an engine speed change progression is confirmed while providing the hydraulic load set in stages to the construction machine (equipment).

When the hydraulic pressure set in stages is sharply applied, the engine speed is temporarily decreased and then restored, and a time point of the restoration is confirmed.

For example, when the amount of drop of the engine speed is larger than a rated engine speed when a hydraulic load of 50% is applied, a next step is performed.

When the amount D1 of drop of the engine speed is smaller than the rated engine speed when a hydraulic load of 75% is applied in the next step, a point, at which the drop point of the engine speed is higher than the rated engine speed, is found while changing a torque inclination.

When a hydraulic load of 100% is applied in a next step, the amount D2 of drop of the engine speed may be remarkably decreased. Even in this case, a point, at which the drop point of the engine speed is higher than the rated engine speed and stable, is found while changing a torque inclination.

As described above, a progression of the change in the engine speed is monitored while applying the hydraulic load increasing in stages, and when the drop point of the engine speed is higher than the rated engine speed or stable, it is considered that dynamic characteristics between the hydraulic load and the engine speed correspond to each other.

In the aforementioned exemplary embodiment, the case where the hydraulic load is 50%, 70%, and 100% has been described as an example, but the hydraulic load may be divided into five sections, 20%, 40%, 60%, 80%, and 100% as illustrated in FIG. 6 to perform the control.

Referring to FIG. 6, as illustrated in FIG. 6A, a time point, at which an engine speed is stable by applying a low load at an initial stage, is found, and an inclination at this time is defined as a first torque inclination R1.

Then, as illustrated in FIG. 6B, a time point, at which an engine speed is stable by applying a load of 20%, is found, and an inclination at this time is defined as a second torque inclination R2.

Similarly, as illustrated in FIGS. 6C, 6D, and 6E, third to fifth torque inclinations R3 to R5 are found in stage and defined.

As described above, the defined first to fifth torque inclinations R1 to R5 generate a map of a torque inclination to each load section as illustrated in FIG. 6F.

The torque inclination map 220 obtained as described above is provided to the torque controller 200 as illustrated in FIG. 4.

The torque controller 200 reflects a torque inclination value to the torque value calculated by the torque calculating unit 210 and generates and outputs first and second correction pump commands Pcmd11 and Pcmd22 to finally control the first and second hydraulic pumps P1 and P2.

That is, the aforementioned torque inclination map 220 is a value, to which a dynamic characteristic of the engine is reflected, so that the finally generated first and second correction pump commands Pcmd11 and Pcmd22 are pump control command values, to which the dynamic characteristic of the engine is reflected.

On the other hand, when a section of a hydraulic load is subdivided, it is possible to more accurately find a dynamic characteristic of the engine, but when the number of subdivided sections is large, it takes much time to find a dynamic characteristic of the engine, so that the number of subdivided sections of the hydraulic load may be 3 to 5.

The section for each load of the hydraulic load may be set at an equal interval. For example, when the hydraulic load is set with five sections, the load section may be set with an equal range of 20%.

In the meantime, as described above the section for each load of the hydraulic load may be set at an equal interval, but may also be set at an unequal interval. For example, the section of the hydraulic load may be set to be subdivided so that a section range is set to be wide for a side having a small hydraulic load, and a section range is set to be relatively narrow for a side having a large hydraulic load. More particularly, when the hydraulic load is set with five sections, a first load section may be set to 0 to 30%, a second load section may be set to 30 to 55%, a third load section may be set to 55 to 75%, a fourth load section may be set to 75 to 90%, and a fifth load section may be set to 90 to 100%.

More particularly, when a hydraulic load is small, a drop phenomenon of an engine speed may not be remarkable, but when a hydraulic load is large, the amount of drop of the engine speed may be large. Accordingly, when the section has the large hydraulic load, the section is set to be subdivided to find a correspondence point of a dynamic characteristic between the hydraulic load and the engine speed. Accordingly, it is possible to more accurately recognize a dynamic characteristic of the engine. That is, in the section for each load, a load range is set to be narrow for a large load section and a load range is set to be wide for a relatively small load section, so that it is possible to set a larger weighted value for a section sensitive to a load response, and thus it is possible to more accurately recognize a dynamic characteristic of the engine.

As described above, the first and second correction pump commands Pcmd11 and Pcmd22 are finally generated by the torque inclination map 220, to which a dynamic characteristic of the engine is reflected, and the first and second hydraulic pumps P1 and P2 are controlled by the first and second correction pump commands Pcmd11 and Pcmd22.

FIGS. 7 and 8 are graphs illustrating a correlation between an engine speed and actual pump torque generated by the first and second correction pump commands Pcmd11 and Pcmd22.

As illustrated in FIG. 7, the actual pump torque is changed according to with the passage of time by a request value, and an engine speed is changed in response to the change of the actual pump torque. It can be seen that when the first and second hydraulic pumps P1 and P2 are controlled by the first and second correction pump commands Pcmd11 and Pcmd22, a drop phenomenon, in which the engine speed is sharply decreased to be smaller than a rated engine speed based on 1,800 rpm of the rated engine speed, is not represented, and a preferable engine speed is represented.

In the meantime, as represented in FIG. 8, it can be seen that the engine speed and pump torque (kgf·m) are controlled in proportion to each other. That is, pump torque may be controlled to have a desired size by controlling the engine speed.

Further, as illustrated in FIG. 3, in comparison with the correlation graph of the engine speed and the pump torque (kgf·m) when the characteristic of the engine is changed, as illustrated in FIG. 8, it can be seen that the hydraulic pump is very stably controlled when the first and second hydraulic pumps P1 and P2 are controlled by the first and second correction pump commands Pcmd11 and Pcmd22.

In the apparatus for controlling the hydraulic pump for the construction machine according to the present disclosure configured as described above, when a normal output is not made due to deterioration or a change of an engine in a hydraulic system, in which a pressure control type electronic hydraulic pump is mounted, a hydraulic pump is controlled by a torque inclination map for each load range reflecting a dynamic characteristic of the engine, so that it is possible to improve the amount of decrease of an engine speed according to a change in a pump load.

Further, the apparatus for controlling the hydraulic pump for the construction machine according to the present disclosure may improve a degree of variation of a pump load and further improve performance of controlling an operating device.

On the other hand, a hydraulic load is applied considering a dynamic characteristic of an engine, so that it is possible to prevent fuel from being excessively consumed by the engine, thereby being helpful to improve fuel efficiency.

The exemplary embodiments of the present disclosure have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustration in all aspects and are not limited, and the scope of the present disclosure shall be represented by the claims to be described below, and all of the changes or modified forms induced from the meaning and the scope of the claims, and an equivalent concept thereof are included in the scope of the present disclosure.

The apparatus for controlling the hydraulic pump for the construction machine according to the present disclosure may be used for controlling a hydraulic pump by reflecting a dynamic characteristic of an engine.

What is claimed is:

1. An apparatus for controlling a hydraulic pump for a construction machine, comprising:

a hydraulic pump control device configured to generate first and second pump commands for controlling first and second hydraulic pumps so that the first and second hydraulic pumps generate pump torque corresponding to request values; and a torque controller configured to:

generate first and second corrected pump commands, which are corrected versions of the first and second pump commands, by a torque inclination map generated according to a characteristic of an engine; and provide the first and second corrected pump commands to the first and second hydraulic pumps, wherein the torque inclination map is generated by:

setting a section of a hydraulic load into at least three sections within a range from a minimum hydraulic load to a maximum hydraulic load, and calculating a torque inclination of each time point, at which a phenomenon of dropping an engine speed is stable when a hydraulic load is generated, for each section of the at least three sections.

2. The apparatus of claim 1, wherein a range of each section for each hydraulic load is differently set.

3. The apparatus of claim 1, wherein a range of each section for each hydraulic load is set to be relatively narrow in a large load section compared to a small load section.

4. The apparatus of claim 1, wherein the torque inclination map is generated by setting a section of a hydraulic load into three to five sections within a range from a minimum hydraulic load to a maximum hydraulic load.

* * * * *